Oct. 18, 1960  N. E. SIEGLE  2,956,486
APPARATUS FOR APPLYING SEALING LIQUID
TO PAVEMENT JOINTS OR THE LIKE
Filed July 22, 1958  2 Sheets-Sheet 1
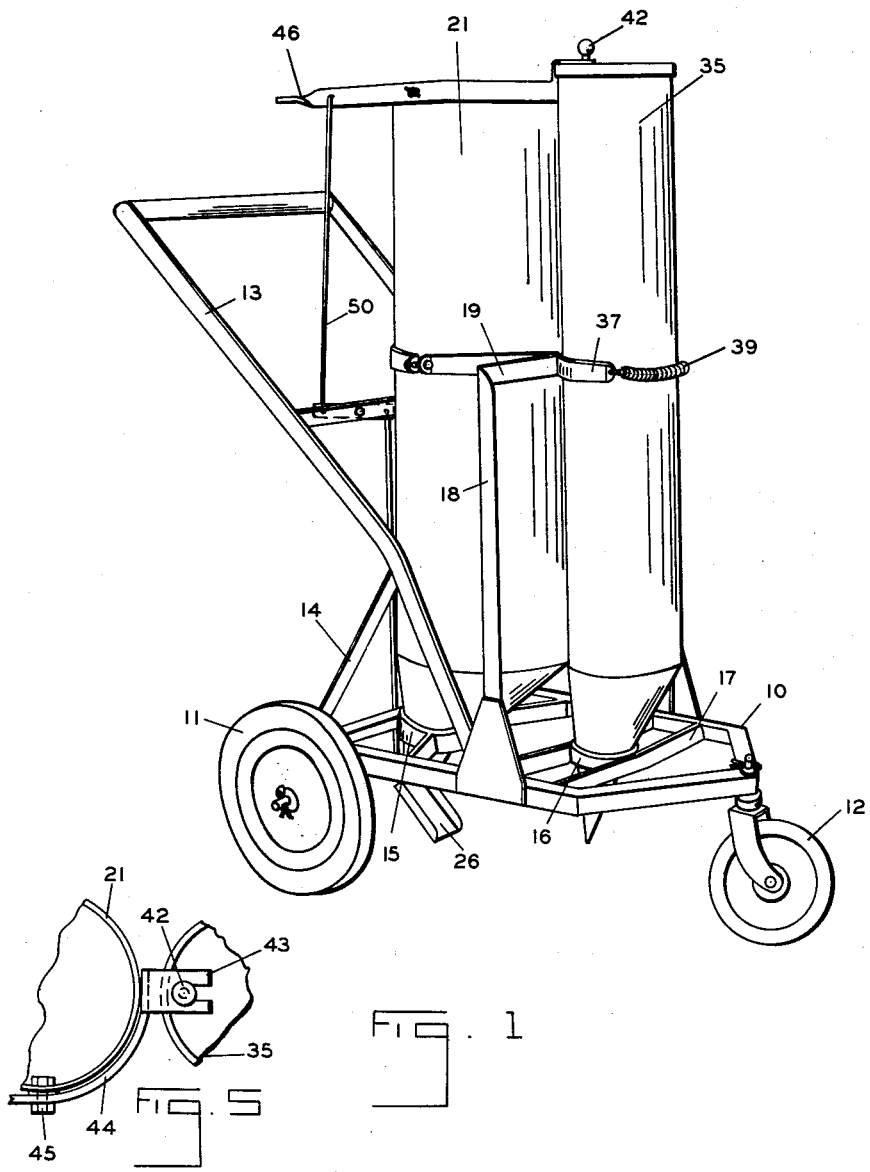
*INVENTOR.*
NORMAN E. SIEGLE
BY CORBETT, MAHONEY, MILLER & RAMBO
BY *Wm. V. Miller*
ATT'YS.

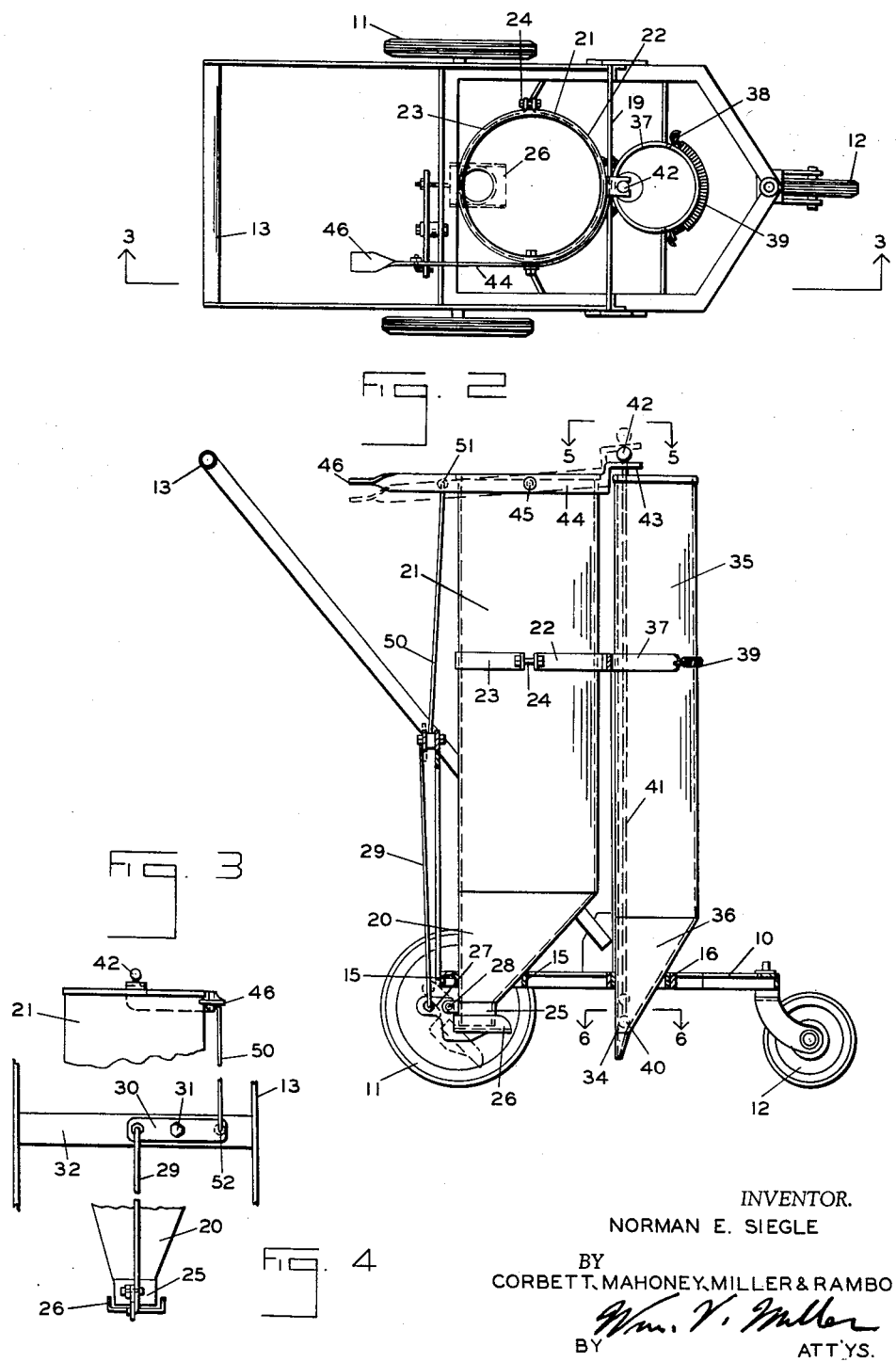

United States Patent Office 2,956,486
Patented Oct. 18, 1960

2,956,486

APPARATUS FOR APPLYING SEALING LIQUID TO PAVEMENT JOINTS OR THE LIKE

Norman E. Siegle, 475 S. 22nd St., Columbus 5, Ohio

Filed July 22, 1958, Ser. No. 750,239

1 Claim. (Cl. 94—44)

My invention relates to an apparatus for applying sealing liquid to pavement joints or the like. It has to do, more particularly, with apparatus in the form of a hand cart, which supports a container for sealing liquid and a container for granular material to be deposited on the sealing liquid after it is applied to the pavement joints. For most uses, the sealing liquid will be a liquid tar or petroleum product and the granular material will be sand.

According to my invention, I provide a portable hand cart which is mounted on wheels so that it can be easily moved and guided over the pavement joints to be treated. This cart is provided with socket supports for receiving separate vertically disposed containers of tubular form for the tar and sand. The containers are removably supported on the cart in tandem relationship and are maintained upright thereon. At the lower end of each container, a control valve is provided for controlling the flow of material from the respective container. Suitable valve operating mechanism is provided which can be readily actuated by a person pushing the cart, to simultaneously close or open both valves.

In the accompanying drawings, I have illustrated the preferred embodiment of my invention and, in these drawings:

Figure 1 is a perspective view of my portable cart.

Figure 2 is a plan view of the cart shown in Figure 1.

Figure 3 is a vertical sectional view taken along line 3—3 of Figure 2.

Figure 4 is a detail in rear elevation of the valve-operating mechanism.

Figure 5 is an enlarged plan view taken on line 5—5 of Figure 3.

Figure 6 is an enlarged horizontal sectional view taken along line 6—6 of Figure 3.

With reference to the drawings, I have illustrated the cart of this invention as comprising a suitable horizontally disposed base or frame 10 which is carried by a pair of rear wheels 11 and a forward caster wheel 12 which facilitates guiding of the cart. Projecting rearwardly and upwardly from the frame 10 is the handle structure 13 by means of which the cart may be pushed. This handle structure 13 is braced on the frame 10 by means of the forwardly and upwardly extending diagonal braces 14. The frame 10 includes a rear socket ring member 15 and a forward socket ring member 16 which are attached to and properly located on the frame by means of the cross braces 17. The frame is further provided with an upstanding standard 18 intermediate its forward and rearward ends which include the upstanding side members rigidly secured to the frame 10 and a transverse upper bar 19.

The rear ring member or socket 15 is adapted to receive the lower funnel-shaped end 20 of a container 21 which is adapted to contain the sand or other granular material. This container 21 is open at its top side. It is removably held in the socket ring 15 by means of a rearwardly opening yoke 22 which is welded to the cross-bar 19 of the support 18 and which is substantially a semi-circle. An additional clamping band 23 is clamped by means of the clamping bolts 24 to the clamping yoke 22 and is disposed in front of the container 21 for holding it in the yoke 22. Thus, the container 21 will be held upright on the frame 10 but can be lifted from the socket ring 15 upon removal of the clamping band 23.

The container 21 has its lower funnel-shaped portion 20 so formed that its annular lower extremity properly fits the ring 15 and is located at the rear side of the container. Pivoted adjacent the lower extremity or discharge throat 25 of the funnel portion 20 is a discharge chute 26. When raised, as indicated by the full lines in Figure 4, this discharge chute will contact the lower straight edge of the throat 25 and close and seal the throat. When swung downwardly, as indicated by the dotted lines in Figure 3 and the full lines in Figure 1, the chute 26 will extend downwardly and forwardly from the throat so as to direct the granular material onto the pavement. The chute 26 is rigidly attached to a bell crank 27 which is pivoted at 28 to the ring 15 at its rear side. This bell crank is moved about its pivot by means of an actuating rod 29 which extends upwardly therefrom at the rear side of the frame 10. The upper end of this rod 29 is connected to the inner end of a lever 30 which is pivoted intermediate its ends as at 31 to a cross brace 32 rigidly attached to the handle 13.

The container 35 for the tar is supported on the frame 10 directly ahead of the container 21. The container 35 is provided with a lower funnel-shaped end 36 which will extend into and engage the socket ring 16 on the frame 10. When the container 35 is supported by the ring socket 16, it fits back within a forwardly opening yoke 37 welded to the bar 19 of the standard 18. This yoke 37 is greater than a semi-circle but is flexible and has hooks 38 at its outer end for receiving the ends of a tension spring 39 which will extend around the front of the container 35 and hold it within the yoke 37. Thus, the container 35 will be readily removable.

The lower extremity of the funnel-shaped portion 36 of the container 35 has a discharge throat 34 of small annular cross-section. This discharge throat is controlled by a ball valve 40 which will seat by gravity in the annular tapering or pointed throat 34 of the funnel portion 36. The vertical position of the ball 40 is controlled by means of a valve rod 41 which extends upwardly through the container 35 and projects upwardly above the open top thereof. The upper end of this rod 41 has another ball 42 thereon. The upper end of the rod 41 beneath the ball 42 receives a lifting fork or yoke 43 which straddles the rod. This fork 43 is on the forward end of a lever 44 which is of arcuate shape so that it extends around one side of the container 21 and is pivoted thereto at 45 at the upper edge of the container. This lever 44, being mounted on the container 21, is removable therewith. The lever 44 extends rearwardly and has a handle 46 at its rear end which is accessible to the operator when he is pushing the cart by means of the handle 13. When the container 35 is removed, the rod 41 is slipped from the fork 43 on the lever 44.

It will be apparent, that if the handle 46 is pushed downwardly, the ball valve 40 will be lifted off its seat in the discharge throat 34 to allow the sealing liquid to discharge from the container 35. If the handle 46 is allowed to return upwardly to its normal position, the ball valve 40 will drop into sealing position, since the rod 41 will be permitted to drop by gravity.

In order that the covering sand will be discharged from the container 21 at the same time that the tar is discharging from the container 35, the valves for the respective containers are connected together for simultaneous operation. Thus, adjacent its rear end, the lever 44 is provided with an actuating rod 50, which is hooked to the member 44 at 51 for ease in disconnecting to permit removal of the container 21 from the frame 10. The lower end of this rod 50 is hooked at 52 to the outer end of the lever 30 on the transverse support 32. Thus, when the handle 46 is in its normal raised position, there is an upward pull on the outer end of the lever 30 which causes its inner end to swing downwardly and thereby actuate the bell crank 27 to raise the chute 26 to its closed sealing position. Concisely, a downward push on the handle 46 will lift the ball valve 40 and simultaneously pull upwardly on the bell crank 27 to swing the chute 26 downwardly to open position.

Thus, it will be apparent that as the cart is pushed along by means of the handle 13, the operator can readily actuate the valve control handle 46. Pushing down on this handle will open the discharge valves of both containers 35 and 21 so that the tar will be discharged from the container 35 onto the pavement and it will be immediately covered with sand being discharged from the container 21. As soon as the pressure on the handle 46 is released, the ball 40 will seat by gravity and the said discharge chute 26 will be swung upwardly into closed position. It will be understood that the rod 41 and the two balls 40 and 42 carried thereby will be of sufficient weight to close the discharge valves of both containers when the handle 46 is released. It will further be apparent that the containers 21 and 35 can be lifted from the respective ring sockets 15 and 16 and be replaced readily. Removal of empty containers and replacement with filled ones may be desirable or removal for cleaning may be desirable. Tipping of the containers when they are positioned in the ring sockets 15 and 16 is precluded by removably clamping them to the standard 18.

Various other advantages will be apparent.

According to the provisions of the patent statutes, the principles of this invention have been explained and have been illustrated and described in what is now considered to represent the best embodiment. However, it is to be understood that, within the scope of the appended claim, the invention may be practiced otherwise than as specifically illustrated and described.

Having thus described my invention, what I claim is:

A cart for treating pavement joints or the like with sealing material comprising a frame mounted on wheels for movement over the joints, a container for liquid sealing material and a container for granular covering material mounted in tandem relationship on the frame, both of said containers having tapering lower ends of annular cross section and said frame having ring sockets removably receiving said tapering ends, a standard projecting upwardly from said frame, removable clamping means connected to said standard and engaging said containers to clamp them thereto to prevent tipping, a discharge valve at the lower end of the first container controlling discharge of liquid sealing material therefrom, a discharge valve at the lower end of the second container controlling the discharge of granular material therefrom, means for operating both of said valves simultaneously, said means comprising actuating linkage connecting the two valves together for simultaneous movement, said valve in the first container being a ball which seats by gravity in a discharge throat of annular cross section at the lower end thereof, said means for operating said ball valve comprising a rod which carries it at its lower end and extends upwardly through the container, said rod having a ball on its upper end engaged by a lifting fork actuated by said linkage, said discharge valve of the second container being a discharge chute carried by the bell crank which is pivoted to the ring socket which receives the second container, said actuating linkage being connected to said bell crank, said actuating linkage comprising a lever pivoted for vertical swinging movement having a handle at one end and said fork at its opposite end, an operating rod extending from said handle and an actuating rod extending from said bell crank, said rods being pivoted to opposite ends of a connecting lever which is pivotally supported on the frame intermediate its ends.

References Cited in the file of this patent

UNITED STATES PATENTS

| | | |
|---|---|---|
| 1,750,104 | Heltzel | Mar. 11, 1930 |
| 1,893,082 | Howard | Jan. 3, 1933 |
| 2,197,878 | Robinson | Apr. 23, 1940 |
| 2,578,080 | Middlestadt | Dec. 11, 1951 |

FOREIGN PATENTS

| | | |
|---|---|---|
| 794,677 | France | Dec. 12, 1935 |
| 702,557 | Great Britain | Jan. 20, 1954 |

UNITED STATES PATENT OFFICE
CERTIFICATE OF CORRECTION

Patent No. 2,956,486            October 18, 1960

Norman E. Siegle

It is hereby certified that error appears in the printed specification of the above numbered patent requiring correction and that the said Letters Patent should read as corrected below.

Column 4, line 13, strike out "charge valve at the lower end of the second container" and insert the same after "dis-", in line 11, same column 4.

Signed and sealed this 11th day of April 1961.

(SEAL)
Attest:
ERNEST W. SWIDER
Attesting Officer

ARTHUR W. CROCKER
                                       Acting Commissioner of Patents